US011401070B2

(12) United States Patent
Vanbiljon

(10) Patent No.: US 11,401,070 B2
(45) Date of Patent: Aug. 2, 2022

(54) LABELLING SYSTEM AND METHOD

(71) Applicant: RIGHT EPHARMACY (PTY) LTD, Centurion (ZA)

(72) Inventor: Andre Vanbiljon, Centurion (ZA)

(73) Assignee: RIGHT EPHARMACY (PTY) LTD, Centurion (ZA)

( * ) Notice: Subject to any disclaimer, the term of this patent is extended or adjusted under 35 U.S.C. 154(b) by 0 days.

(21) Appl. No.: 16/632,258

(22) PCT Filed: Jul. 17, 2018

(86) PCT No.: PCT/IB2018/055308
§ 371 (c)(1),
(2) Date: Jan. 17, 2020

(87) PCT Pub. No.: WO2019/016708
PCT Pub. Date: Jan. 24, 2019

(65) Prior Publication Data
US 2020/0165024 A1 May 28, 2020

(30) Foreign Application Priority Data

Jul. 17, 2017 (ZA) .................................. 2017/00357

(51) Int. Cl.
*B65C 1/02* (2006.01)
*B65C 3/10* (2006.01)
(Continued)

(52) U.S. Cl.
CPC ................ *B65C 1/021* (2013.01); *B65C 3/10* (2013.01); *B65C 9/04* (2013.01); *B65C 9/36* (2013.01);
(Continued)

(58) Field of Classification Search
CPC .. B65C 1/021; B65C 3/10; B65C 3/26; B65C 5/00; B65C 5/02; B65C 9/04;
(Continued)

(56) References Cited

U.S. PATENT DOCUMENTS 4,025,385 A * 5/1977 Wood ........................ B65C 9/24
156/568
4,321,103 A 3/1982 Lindstrom et al.
(Continued)

FOREIGN PATENT DOCUMENTS

| EP | 0608296 | 8/1994 |
|----|---------|--------|
| WO | WO 1993/08081 | 4/1993 |

OTHER PUBLICATIONS

International Search Report and Written Opinion for PCT/IB2018/055308 dated Jan. 9, 2019, 15 pages.

*Primary Examiner* — George R Koch
(74) *Attorney, Agent, or Firm* — Sheppard Mullin Richter & Hampton LLP

(57) ABSTRACT

This invention relates to a labelling apparatus (1) and method for labelling different shapes, sizes and material types of packaging (3, 36) such as cardboard or plastics material boxes, plastics or other material bottles and sachets all containing medicaments being dispensed. The labelling apparatus (1) includes a conveyor means (4) having a receiving end for receiving an article (3, 36) to be labelled from a chute (2) and a discharge end for discharging the article (3, 36) once labelled to a receiving container (9), a label applicator (15) for attaching a label (29) to the article and a label securing means (25) for securely forcing the label (29) onto the article.

38 Claims, 16 Drawing Sheets

(51) Int. Cl.
  *B65C 9/04* (2006.01)
  *B65C 9/36* (2006.01)
  *B65G 47/244* (2006.01)
  *B65C 9/40* (2006.01)

(52) U.S. Cl.
  CPC ...... *B65G 47/244* (2013.01); *B65C 2009/407* (2013.01)

(58) Field of Classification Search
  CPC ..... B65C 9/045; B65C 9/36; B65C 2009/407; B65G 47/244; G07F 17/0092
  See application file for complete search history.

(56) References Cited

U.S. PATENT DOCUMENTS

| | | | | |
|---|---|---|---|---|
| 5,168,883 A | * | 12/1992 | Winn | B65B 69/00 |
| | | | | 131/283 |
| 5,425,823 A | * | 6/1995 | Woodside, III | B65C 1/02 |
| | | | | 156/277 |
| 6,155,322 A | | 12/2000 | Landan et al. | |
| 2015/0232219 A1 | * | 8/2015 | Kern | B65B 35/38 |
| | | | | 53/443 |
| 2019/0164639 A1 | * | 5/2019 | Saaraswat | G06F 16/2365 |

\* cited by examiner

LABELLING SYSTEM AND METHOD

CROSS REFERENCE TO RELATED APPLICATIONS

This application is a U.S. National Stage Application under 35 U.S.C. 371 of International Application No. PCT/IB2018/055308, filed Jul. 17, 2018, which claims priority to South Africa Patent Application 2017/00357, filed Jul. 17, 2017. The contents of each of the aforementioned are hereby incorporated by reference in their entirety into the present disclosure.

FIELD OF THE INVENTION

This invention relates to a labelling apparatus and method and more particularity, but not exclusively, to a labelling apparatus and method for labelling different shapes, sizes and material types of packaging such as cardboard or plastics material boxes, plastics or other material bottles and sachets all containing medicaments being dispensed.

BACKGROUND TO THE INVENTION

Labelling apparatus for use in medicine or pharmaceutical dispensing systems are known. One such system is described in U.S. Pat. No. 9,721,418 B2 in the name of Medavail, Inc., entitled "Vending machine container labelling and dispensing method" discloses a vending machine in communication with a remote station. The vending machine "delivers labelled containers to a user from storage holding containers of different sizes and shapes and containing different products such as medicaments. A control system is operable to select a specific unlabelled container from among the other containers in storage, and to move the selected unlabelled container to a labelling module where a label is applied after the position of the label and/or the selected unlabelled container are/is just so as to result in the label being applied at a desired position and angular orientation with respect to the selected unlabelled container. The control system is further operable to move the label container to a delivery zone accessible to the user."

OBJECT OF THE INVENTION

It is an object of this invention to provide a labelling apparatus and method of the type described above.

SUMMARY OF THE INVENTION

In accordance with this invention there is provided a labelling apparatus comprising a conveyor means having a receiving end for receiving an article to be labelled and a discharge end for discharging the article once labelled, a label applicator for attaching a label to the article and a label securing means for securely forcing the label onto the article.

The article has a curved, uneven, angled or flat surface.

The article is a bottle, box or sachet; alternatively, the article is a container that contains a medicament.

There is provided for the conveyor means to be a continuous conveyor belt extending around rollers at opposite ends of the conveyor means.

The label applicator includes an applicator arm movable between a retracted position in which it receives the label at the free end of the arm and an extended position in which an adhesive side of the label is pushed onto the article.

There is provided for the label securing means to be a resiliently deformable object movable between a position removed from the article to a position in which it is forced onto the label and the article so that it deforms to take the shape of an exposed side of the article to force the label to securely attach to the article.

The object may be made from foam rubber or is a sponge.

A suction means is movable between an engagement position in which it engages the sachet in a container and a retracted position in which the sachet is attached to the suction means and moved out of the container.

A discard apparatus pushes the container off the conveyor when the suction means is in its retracted position.

The suction means releases the sachet when the suction means is in its retracted position and when the container is removed from the conveyor so that the sachet falls onto the conveyor.

There is provided for the conveyor receiving ended to the operatively underneath a discharge end of a delivery chute for receiving the article on the receiving end of the conveyor.

The discharge end of the conveyor terminates at a dispensing container for discharging the article, once labelled, into the dispensing container.

The dispensing container includes a trapdoor which trapdoor is located in a front cover of a pharmaceutical dispenser unit.

The pharmaceutical dispensing unit also includes a patient interface in the front cover thereof.

The patient interface includes a screen and communication means having a microphone and a speaker, a keypad and a card reader.

The article is moved along the conveyor to operatively underneath the label applicator for attaching a label and then to underneath the label securing means securely forcing the label onto the article.

Alignment means align and article to be labelled on the conveyor means before a label is applied to the article.

A suction device is located above the conveyor means and which suction device includes a suction cup movable onto the article to attached to the article through negative vacuum pressure and to lift the article away from the conveyor means by moving the suction cup away from the conveyor means.

The invention extends to a labelling method comprising the steps of:
  receiving an article to be labelled on a conveyor means;
  moving the article, on the conveyor means, to operatively underneath a label applicator;
  attaching a label, at least partially, to the article;
  forcing, with a label securing means, a major part of the label onto the article.

The invention includes the step of aligning the article on the conveyor means.

There is provided for applying a suction force to the article to lift the article out of a dispensing container or box and to release the suction force from the article to drop the article back onto the conveyor means once the dispensing container or box has been moved off the conveyor means.

There is also provided for a step of forcing an incorrect article, and article having been incorrectly labelled or a dispensing container or box off the side of the conveyor means.

These and other features of the invention are described in more detail below.

BRIEF DESCRIPTION OF THE DRAWINGS

An embodiment of the invention is described below by way of example only and with reference to the drawings in which.

DETAILED DESCRIPTION OF THE DRAWINGS

Figure 1:
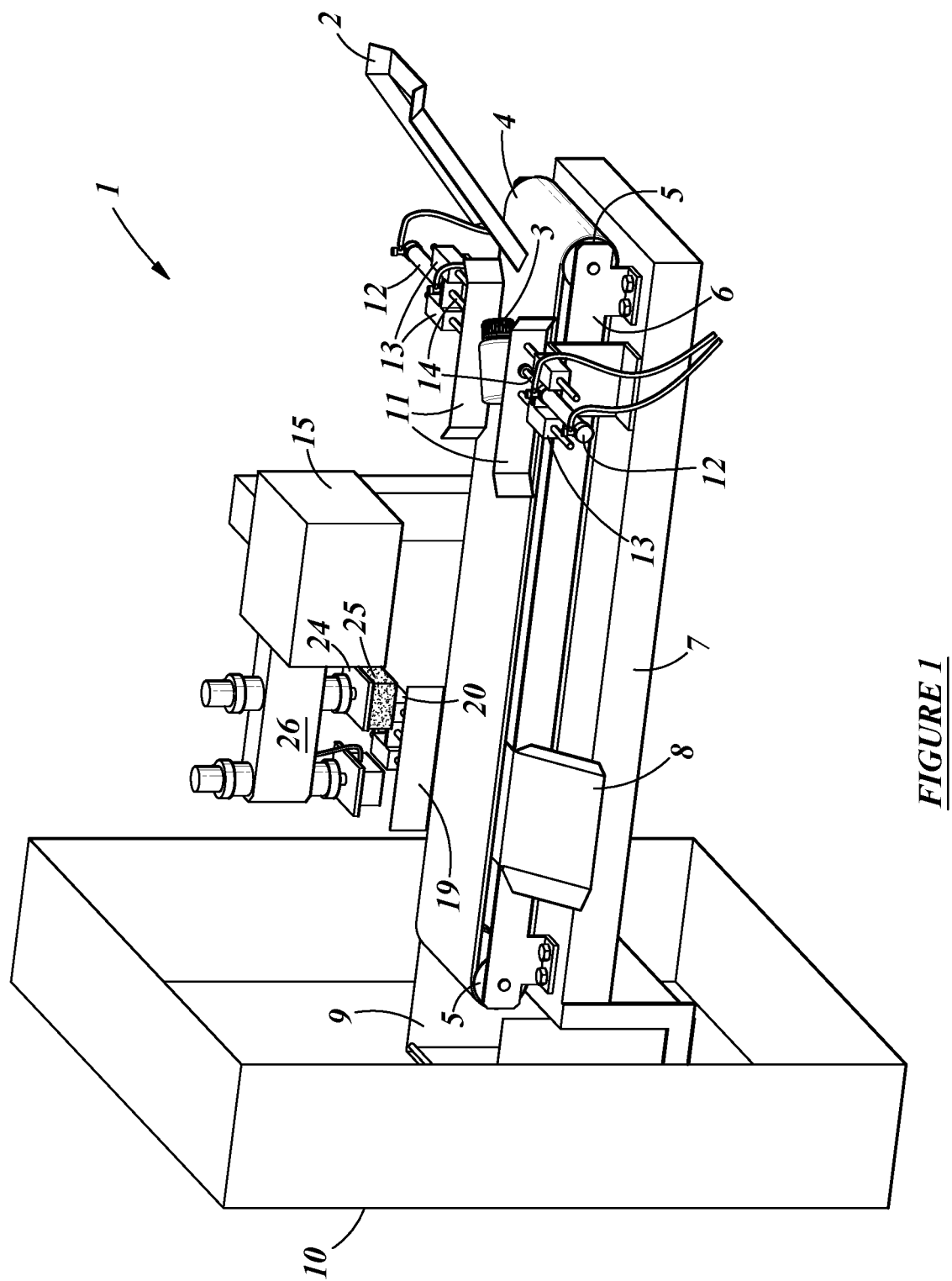
FIG. 1 shows a perspective view of a labelling apparatus with a misaligned medicine bottle on a conveyer belt of the labelling apparatus.

With reference to the drawings a labelling apparatus is generally indicated by reference numeral 1.

The labelling apparatus 1 includes a conveyor means for having a receiving end that terminates underneath an outlet of a chute 2 and on opposite discharge end that terminates over a dispensing container 9. The conveyor means is a continuous conveyor belt 4 for located over rollers 5. The rollers 5 are supported between roller support braces 6. The support braces 6 are, in turn, attached to a support platform 7.

The conveyor belt for rotates anticlockwise about the rollers 5 when the apparatus 1 is viewed as shown in the drawings.

In accordance with a $1^{st}$ example of the invention, the chute 2 discharges a medicine bottle 3 on the receiving end of the conveyor belt 4. As the conveyor belt 4 rotates, the bottle 3 moves in between alignment plates 11. The alignment plates 11 are elongate in the direction of the conveyor belt 4 and face each other from opposing sides of the conveyor belt 4. An alignment actuator rod 14 is selectively movable into and out of an alignment actuator housing 12 between a retracted position and an extended position. An operatively inner end of the alignment actuator rod 14 is attached to a rear surface of each alignment plate 11 so that movement of the alignment actuator rod 14 moves the plate 11 from a side of the conveyor belt 4 towards a centre thereof. Alignment movement support rods are attached on either side of the alignment actuator rod 14 to the alignment plates and are movable together with the alignment plates 11 in alignment movement support blocks 13. This supports the alignment plates so that they do not rotate about their connection with the alignment actuator rod or so that they do not cause rotation of the alignment actuator rod within the alignment actuator housing.

Figure 3:
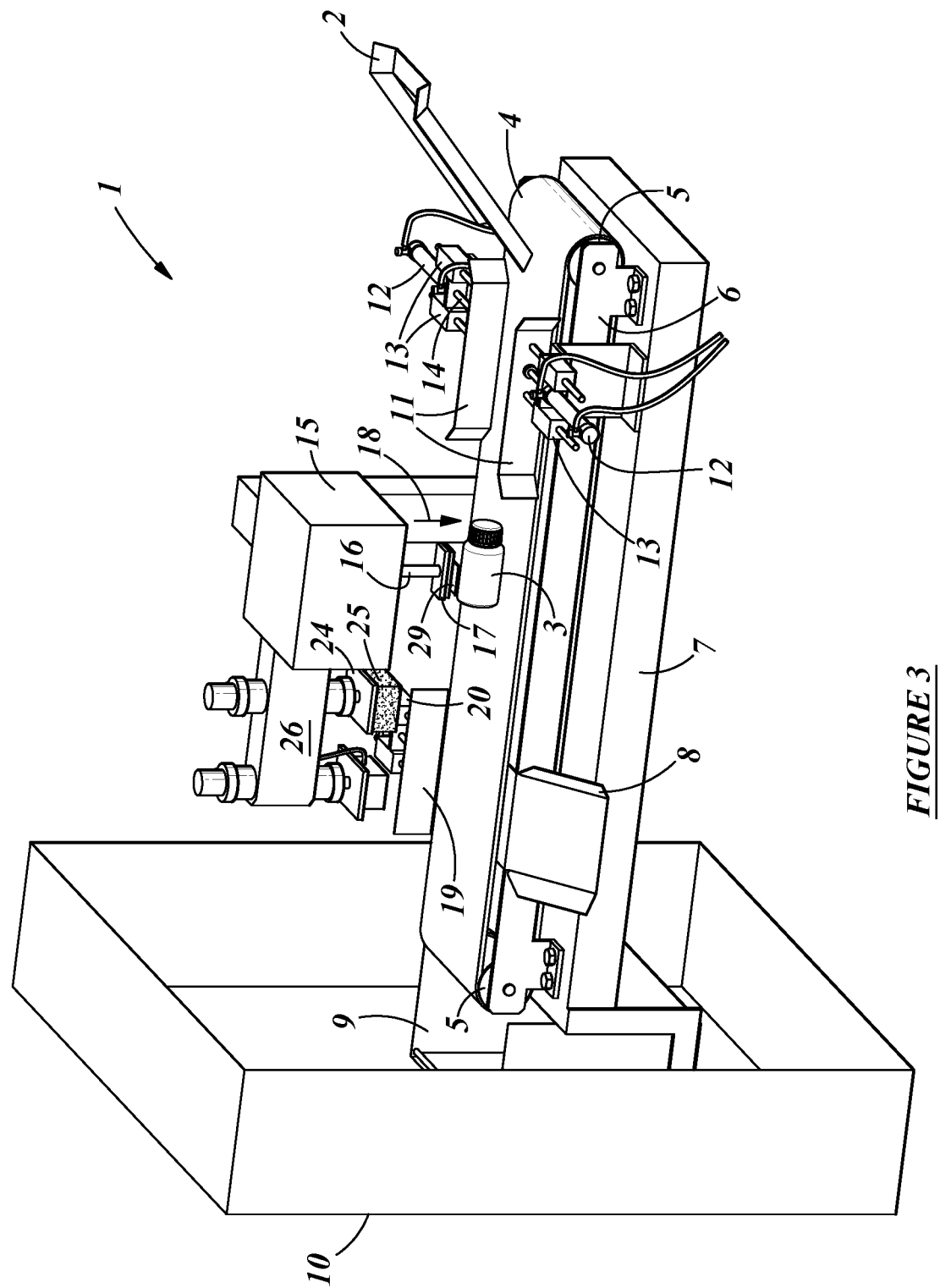
FIG. 3 shows the same view of the apparatus of FIGS. 1 and 2 with the medicine bottle below a label applicator with an arm of the applicator partly extended.

The arrows 28 shown in FIG. 3 show the direction of movement of the plate 11 from their retracted to their extended positions.

A further device, in the form of a label applicator 15, is next in line in the direction of movement of the top portion of the conveyor belt. The label applicator 15 includes a label applicator arm 16 that receives, in use, a label from a label roll and a printer (not shown) on a label applicator plate 17, at a free end of the label applicator arm 16.

Figure 4:
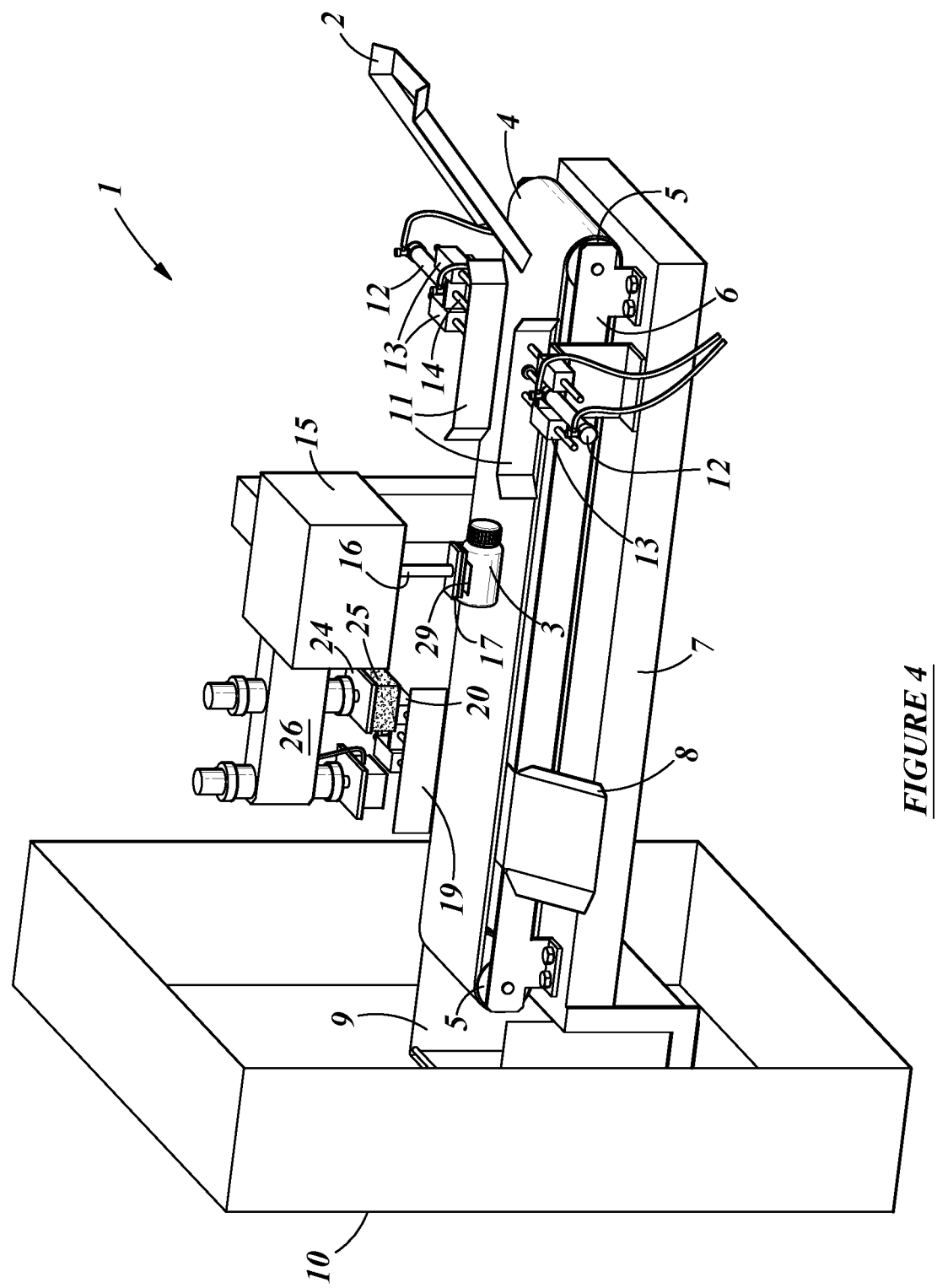
FIG. 4 shows the same view of the apparatus of FIGS. 1 to 3 with the label applicator arm abutting the medicine bottle.

The label applicator arm 16 is movable from a retracted position in which it locates mostly with in the label applicator 15 to an extended position as shown in FIG. 4.

The next device, in the direction of movement of the top section of the conveyor belt 4, is a sponge movement apparatus supported in a support beam 26 the sponge movement apparatus includes a sponge support plate 24 at the end of a sponge arm 27. The sponge arm 27 is movable from a retracted position in which it allows the movement of articles freely along the conveyor belt 4 to extended position in which a sponge 25 on the operatively underside of the sponge support plate 24 is pressed onto an article, such as the medicine bottle 3, to be labelled.

A further device is supported on the beam 26, further down in the direction of movement of the upper portion of the conveyor belt. This device is a suction apparatus 38 having a suction cup 37 movable between a retracted position in which it allows free, unimpeded movement of articles on the conveyor belt and an extended position in which a suction cup 37 or suction means at a free end of the suction arm 39 touches an article such as a plastics material sachet 36 and engages it for applying a vacuum through the suction cup 37 and up the arm of the suction apparatus 38.

A still further device in the form of a discard device includes a discard plate 19 located underneath to the side of the suction device. The discard device includes a discard plate 19 which is elongate and orientated in the direction of the conveyor belt 4, coaxially there with and to the side of the conveyor belt so that, in a retracted position it allows free movement of articles on the conveyor belt 4. The discard support rod 22 is attached behind the discard plate and discard plate movement support rods 23 located on either side of the discard supporter rod 22 and on movable in discard support blocks 20 to ensure steady movement and prevent rotation of the plate 19 when the discard support rod 22 is extended from a retracted position to an extended position in which the plate has moved across the conveyor belt towards the discard shoot 8 thus to push an article moving or, in the case of the conveyor belt being at standstill, off the conveyor belt and onto the discard shoot 8 from where it can be discarded into a discard receptacle.

The dispensing container 9 is located and attached to a pharmaceutical dispenser unit front cover 10. The dispensing container can be accessed through a trapdoor from an operatively front side of the pharmaceutical dispensing unit (PDU) as is described further below.

The front cover 10 of the PDU includes a user interface and communication means in the form of a screen 31 a keyboard 32 a card reader slot 34 a speaker 33 and a microphone (not shown). The flat door 30 is operable from a front side of the PDU and is normally locked. The flat door is unlocked and access to the dispensing container is allowed once a patient has been positively identified and once it is confirmed that the correct medicine has been dispensed into the dispensing container.

Figure 12:
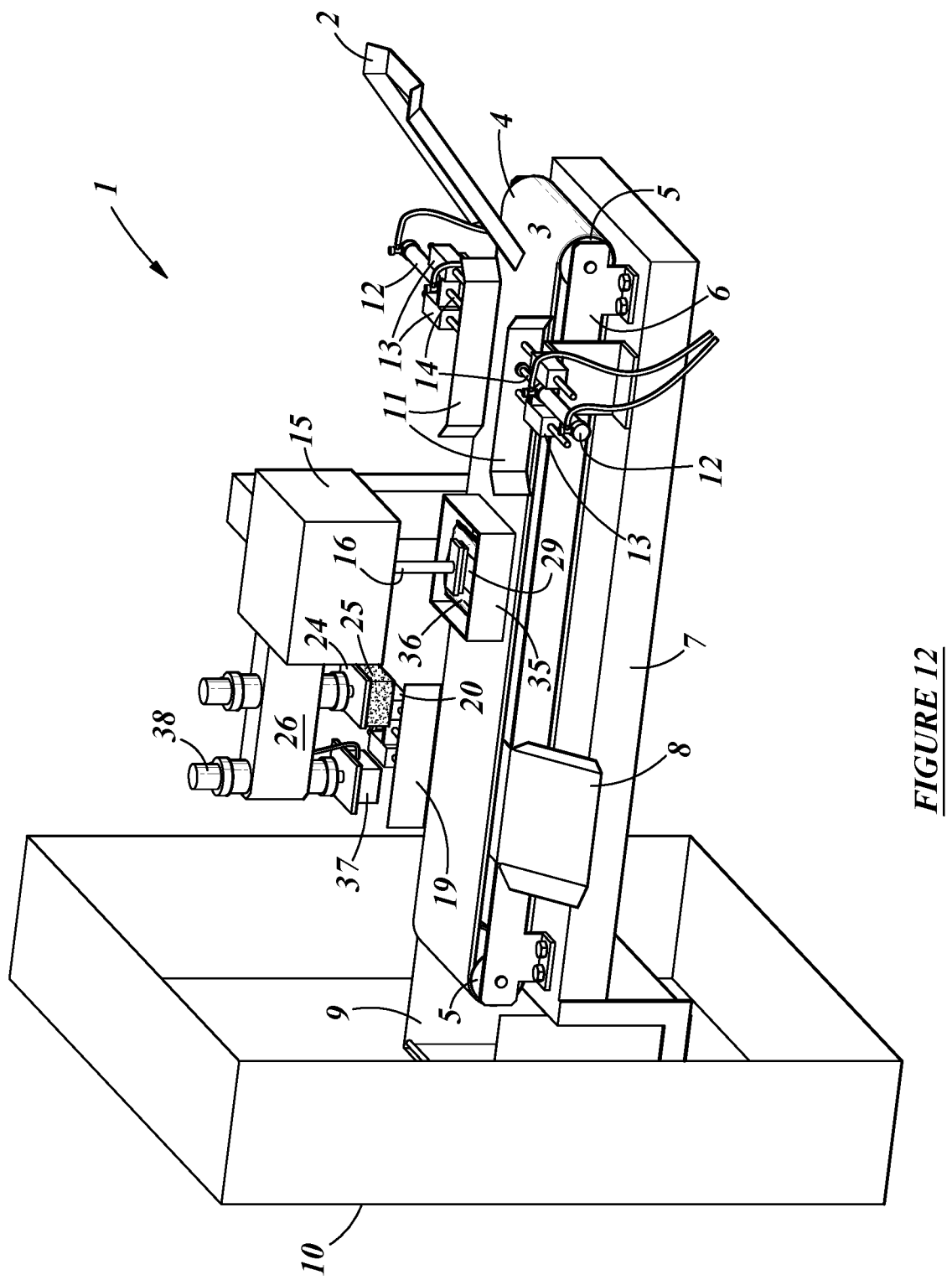
FIG. 12 shows the same view of the apparatus of FIGS. 1 to 10 with a dispensing box having a sachet therein, on the conveyer belt below the label applicator with the label applicator arm extended onto the sachet in the box.
Figure 13:
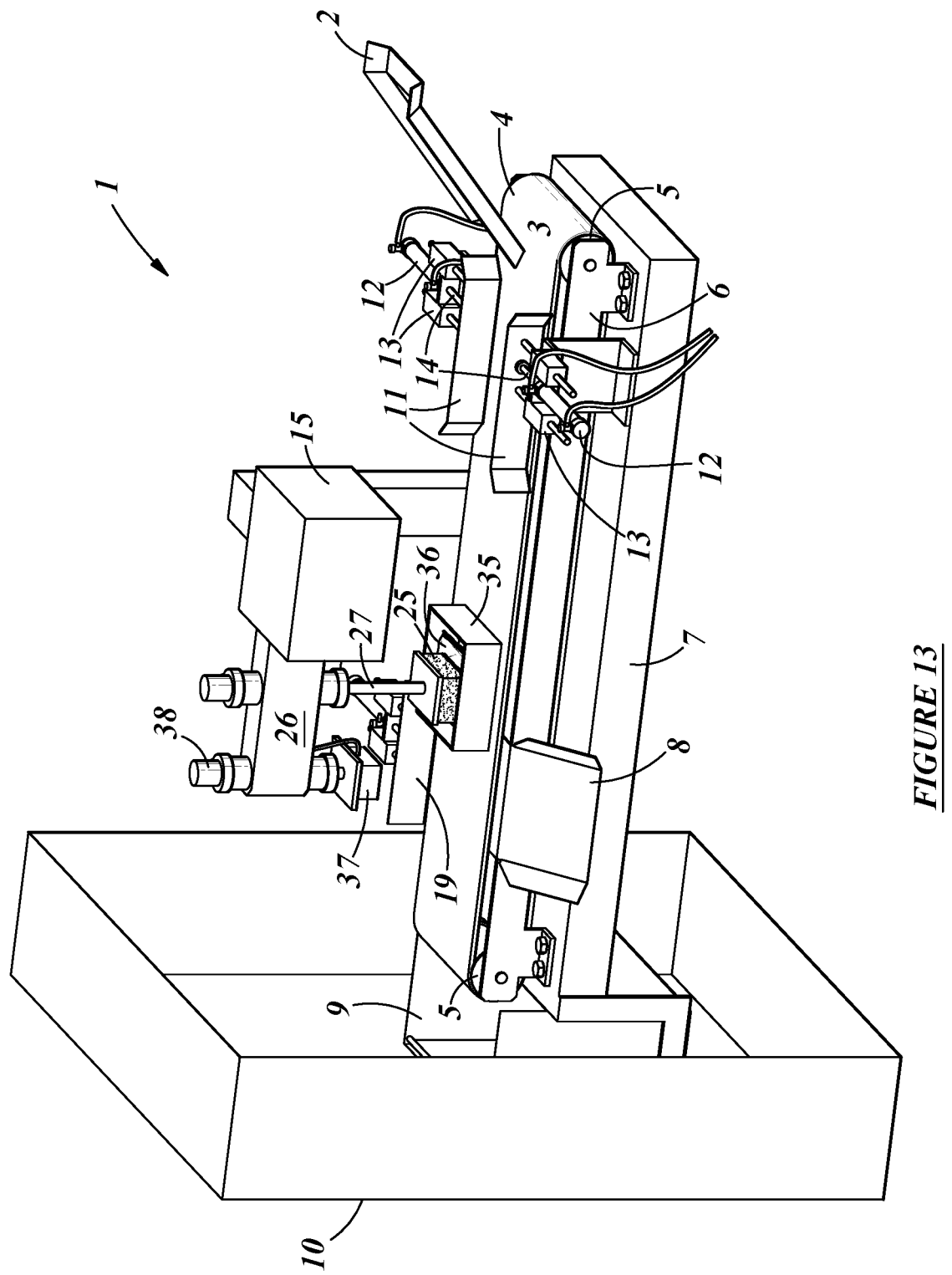
FIG. 13 shows the same view of the apparatus of FIGS. 1 to 10 and 12 with the sponge referred to in the description of FIG. 8 above, engaged with the sachet referred to in the descriptions of FIG. 12.
Figure 14:
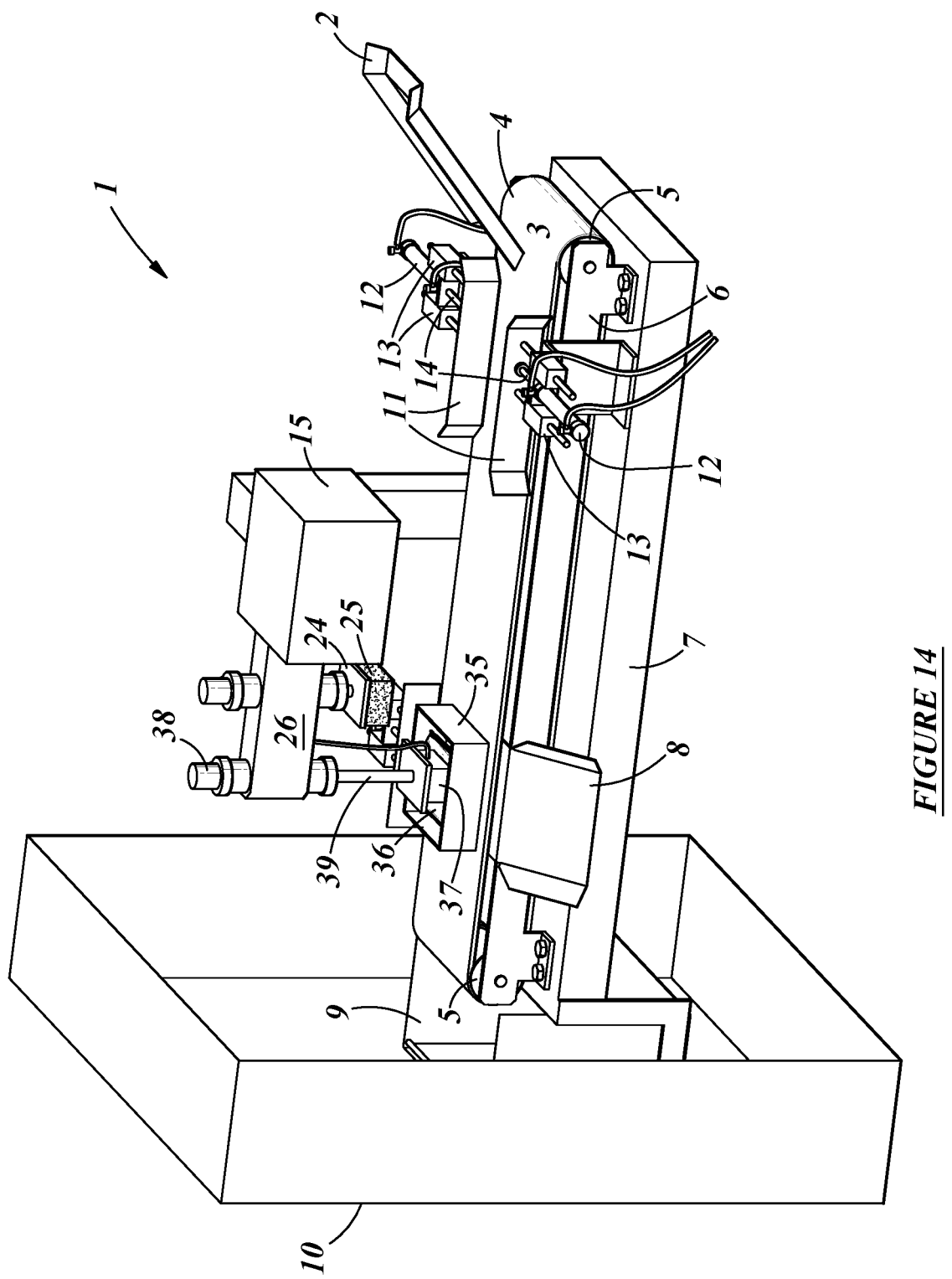
FIG. 14 shows the same view of the apparatus of FIGS. 1 to 10 and 12 and 13 with a suction cup engaged with the sachet.
Figure 15:
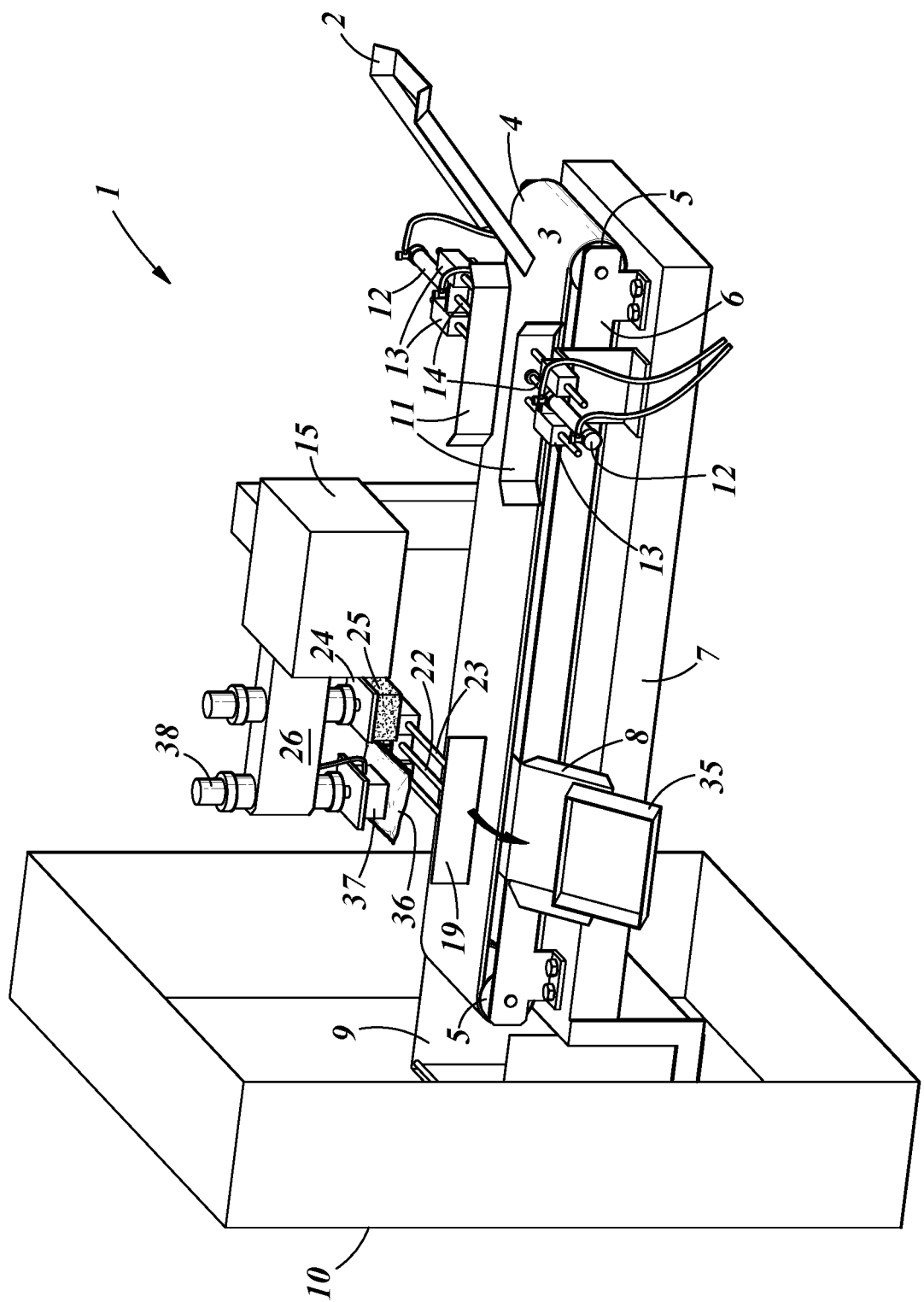
FIG. 15 shows the same view of the apparatus of FIGS. 1 to 10 and 12 to 14 with a discard plate discarding the dispensing box to the side.
Figure 16:
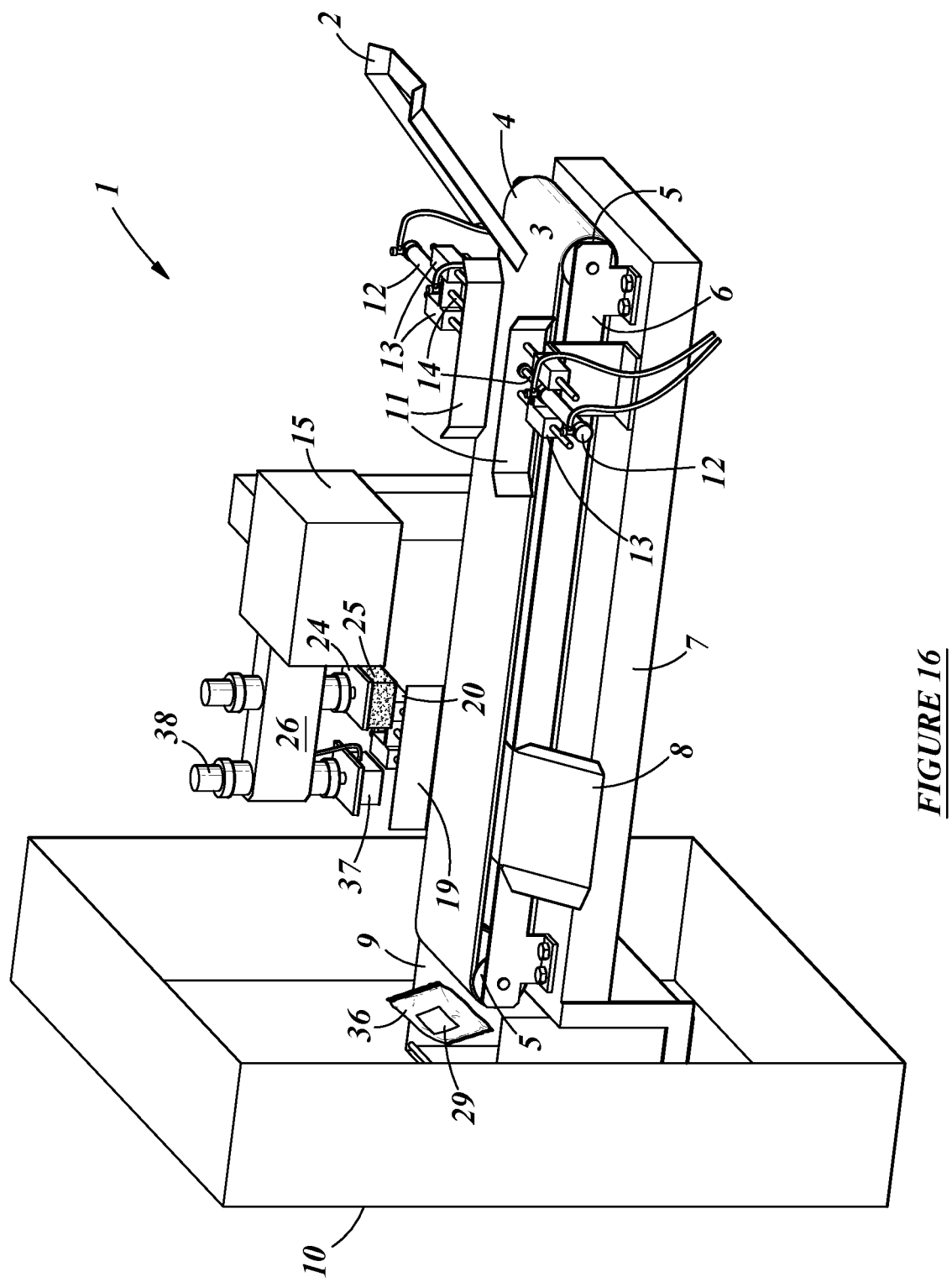
FIG. 16 shows the same view of the apparatus of FIGS. 1 to 10 and 12 to 15 with the sachet referred to in the description of FIGS. 12, 13 and 14 falling into the dispensing container referred to in the description of FIG. 10.

In a $2^{nd}$ example, and as shown in FIG. 12, a sachet 36 moves along the conveyor belt 4 in a sachet dispensing box 35 which has been dispensed by dropping the dispensing box 35 down the chute 2 so that it lands with its open end facing upwards on the conveyor belt 4 and then moves along the conveyor belt 4 as described in more detail below.

Figure 2:
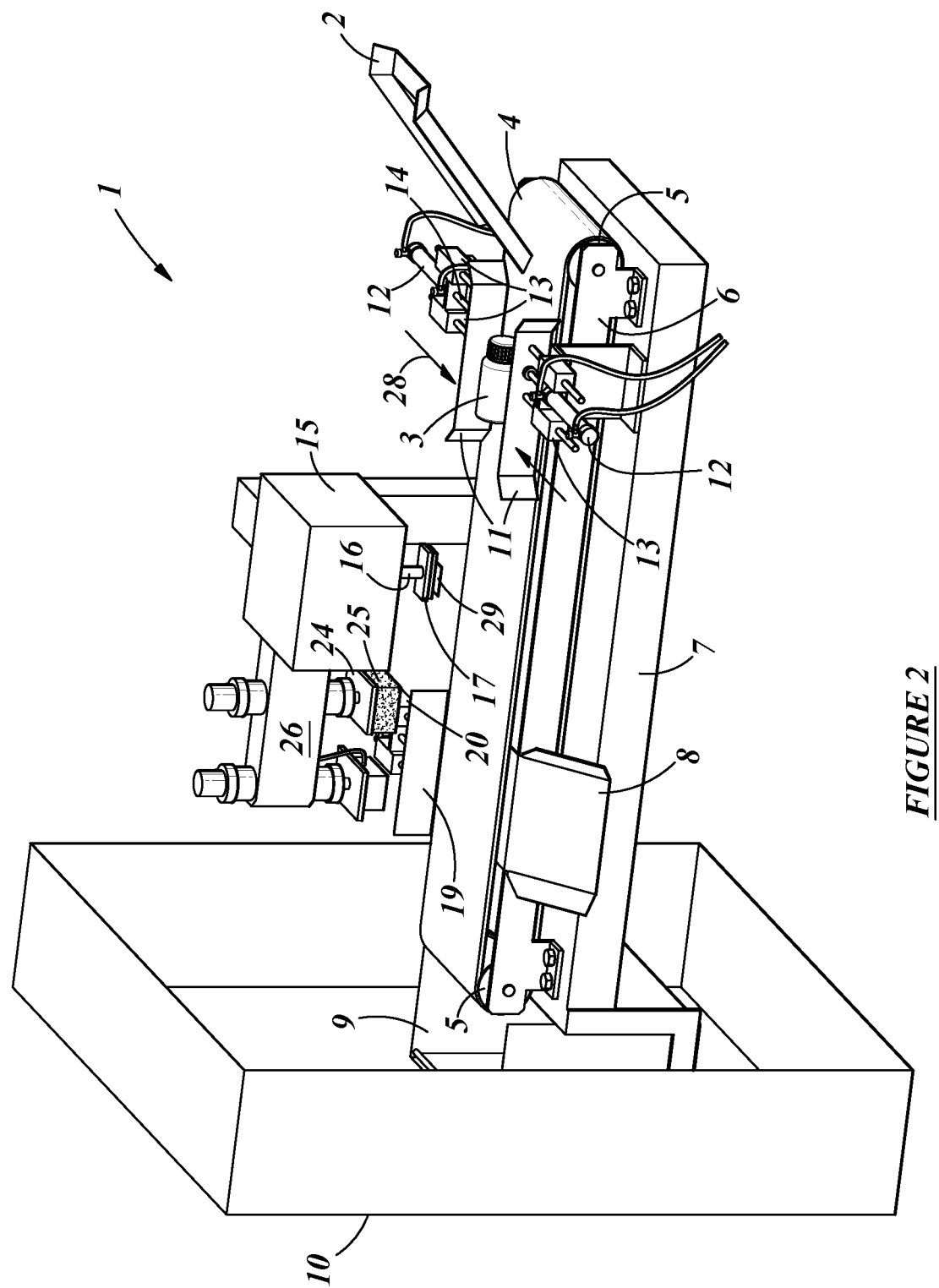
FIG. 2 shows the same view of the labelling apparatus of FIG. 1 with the medicine bottle aligned on the conveyer belt.
Figure 5:
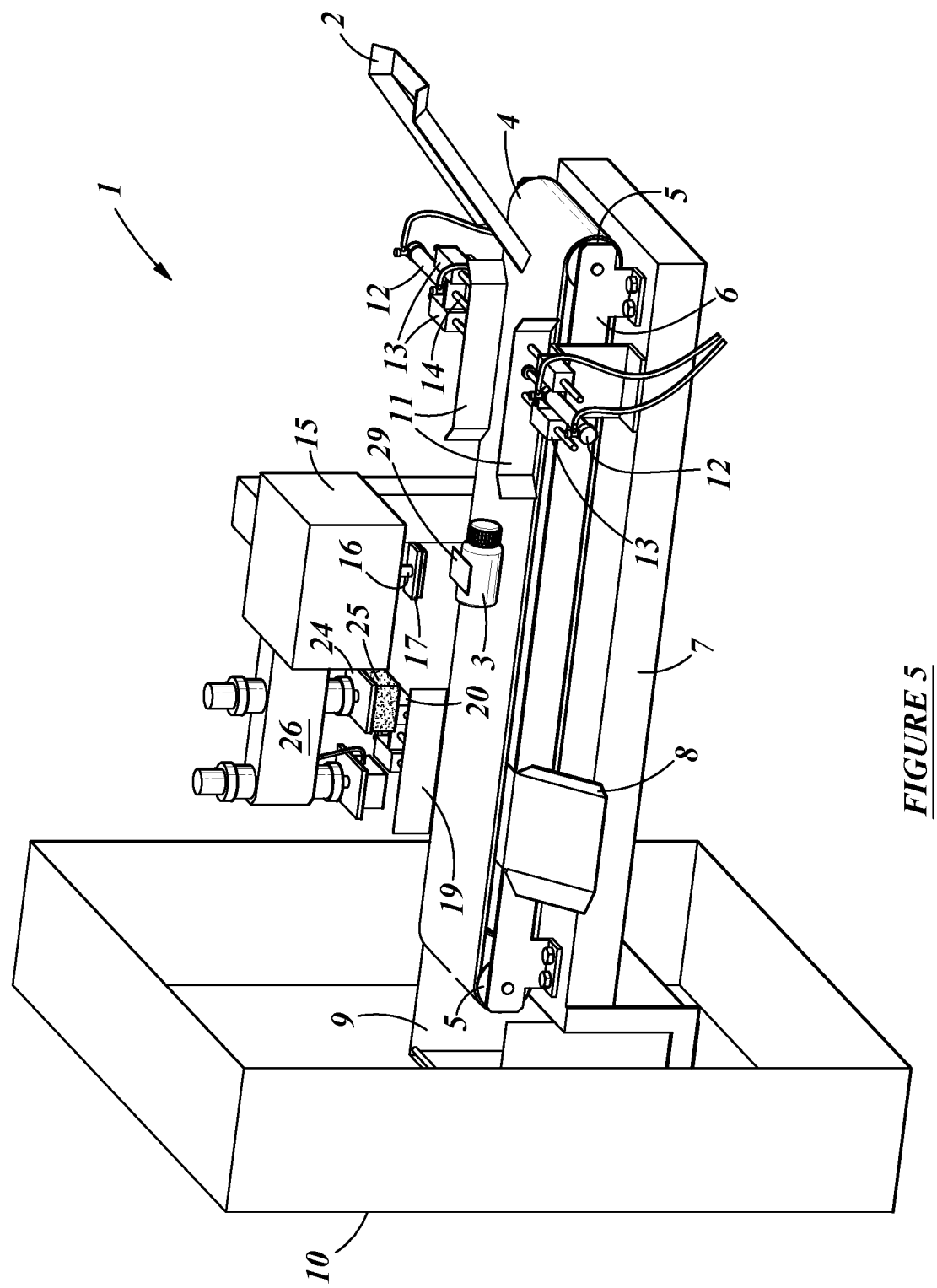
FIG. 5 shows the same view of the apparatus of FIGS. 1 to 4 with the label applicator arm retracted.
Figure 6:
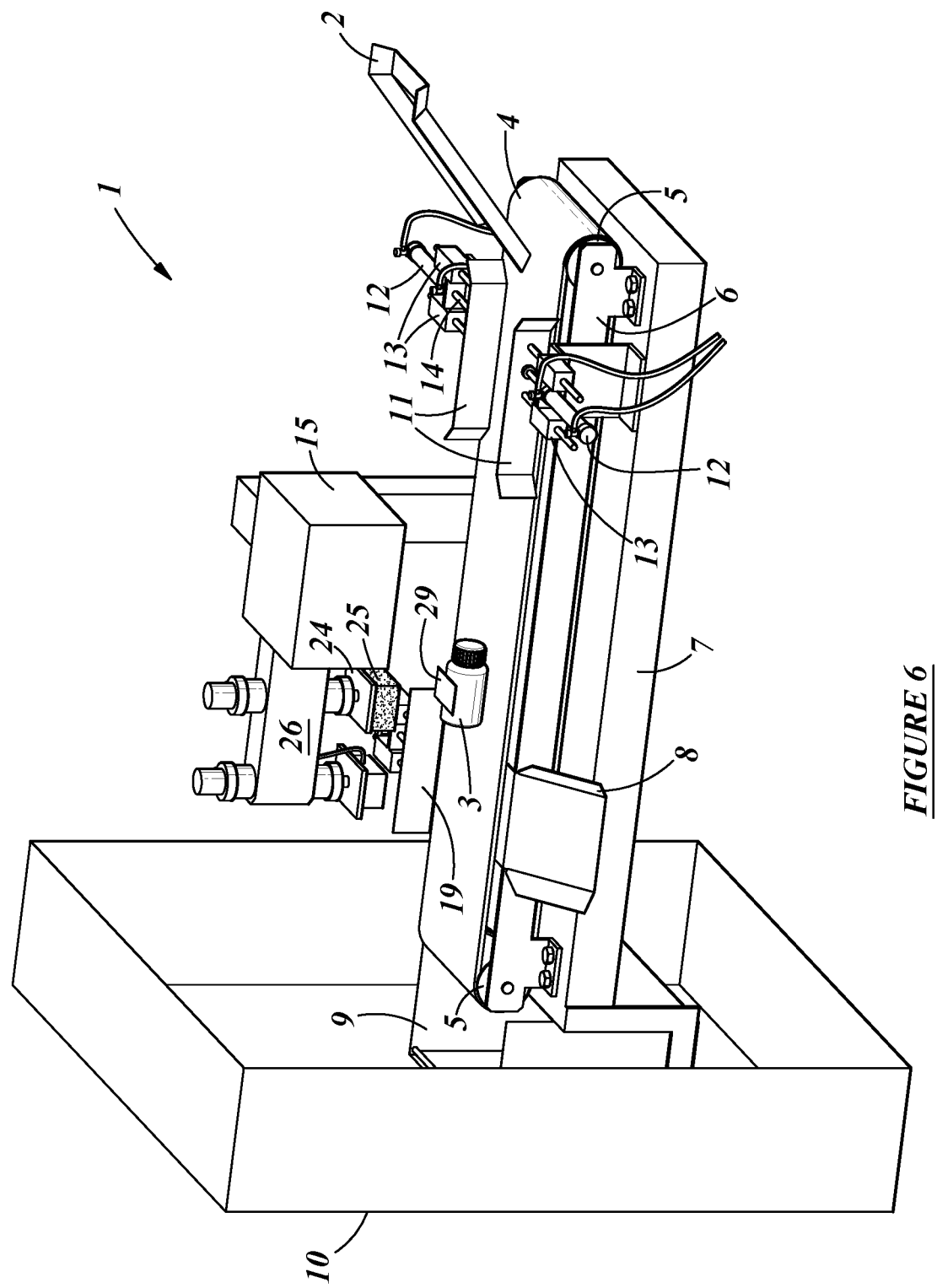
FIG. 6 shows the same of the apparatus of FIGS. 1 to 5 with a label applied to the medicine bottle.
Figure 7:
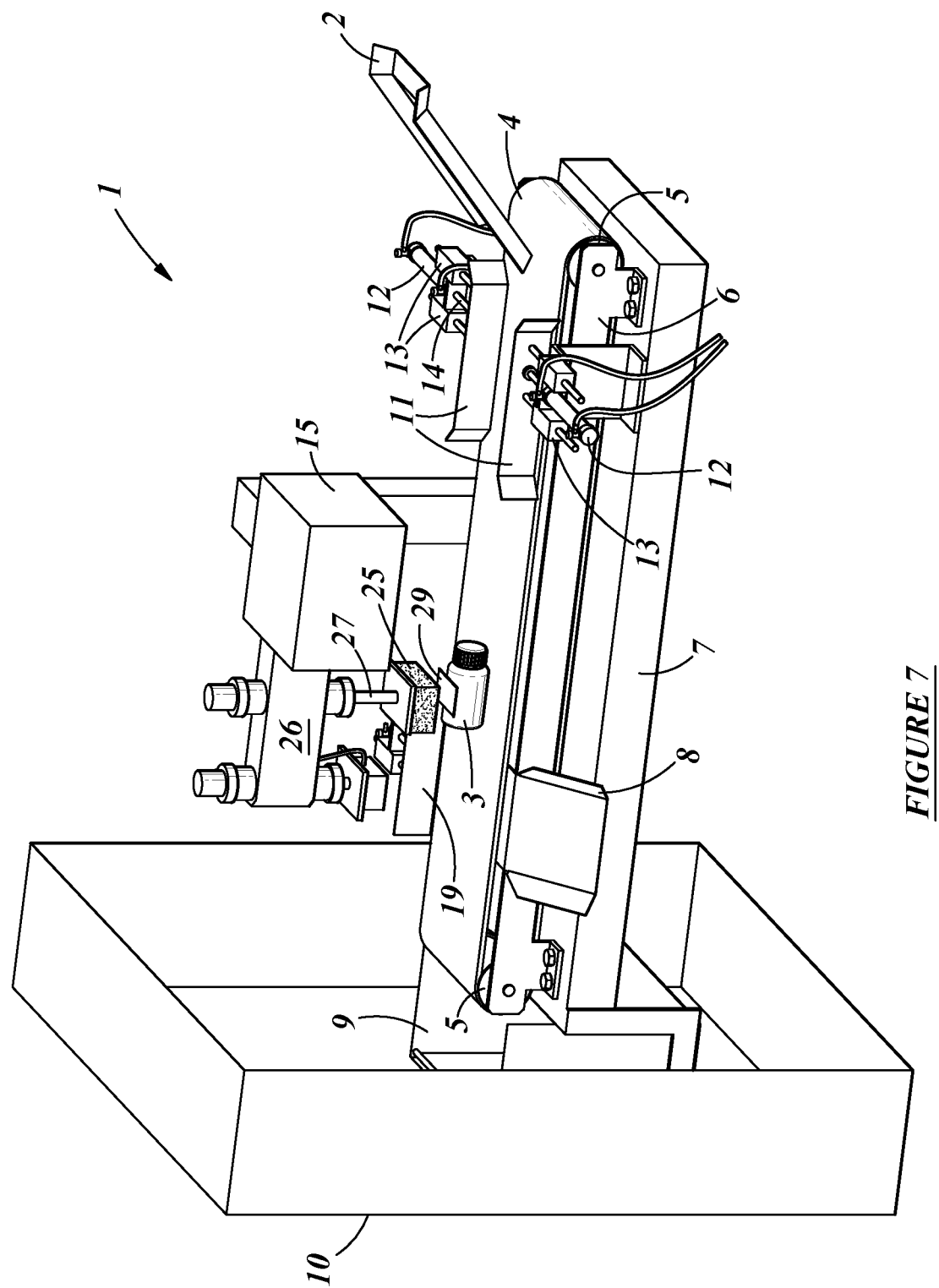
FIG. 7 shows the same view of the apparatus of FIGS. 1 to 6 with an arm of a sponge movement apparatus partially extended.
Figure 8:
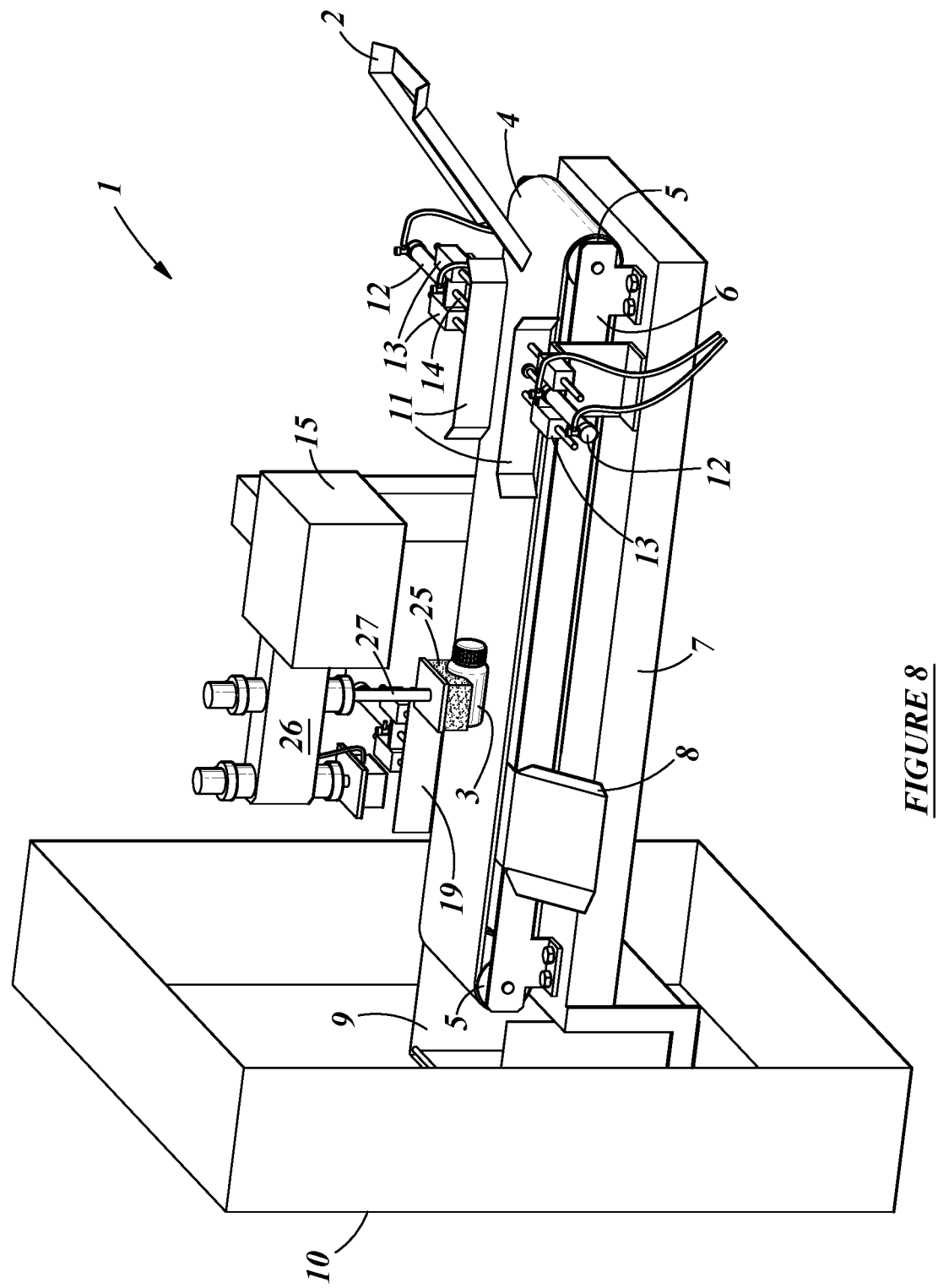
FIG. 8 shows the same view of the apparatus of FIGS. 1 to 7 with a sponge engaged with the medicine bottle.
Figure 9:
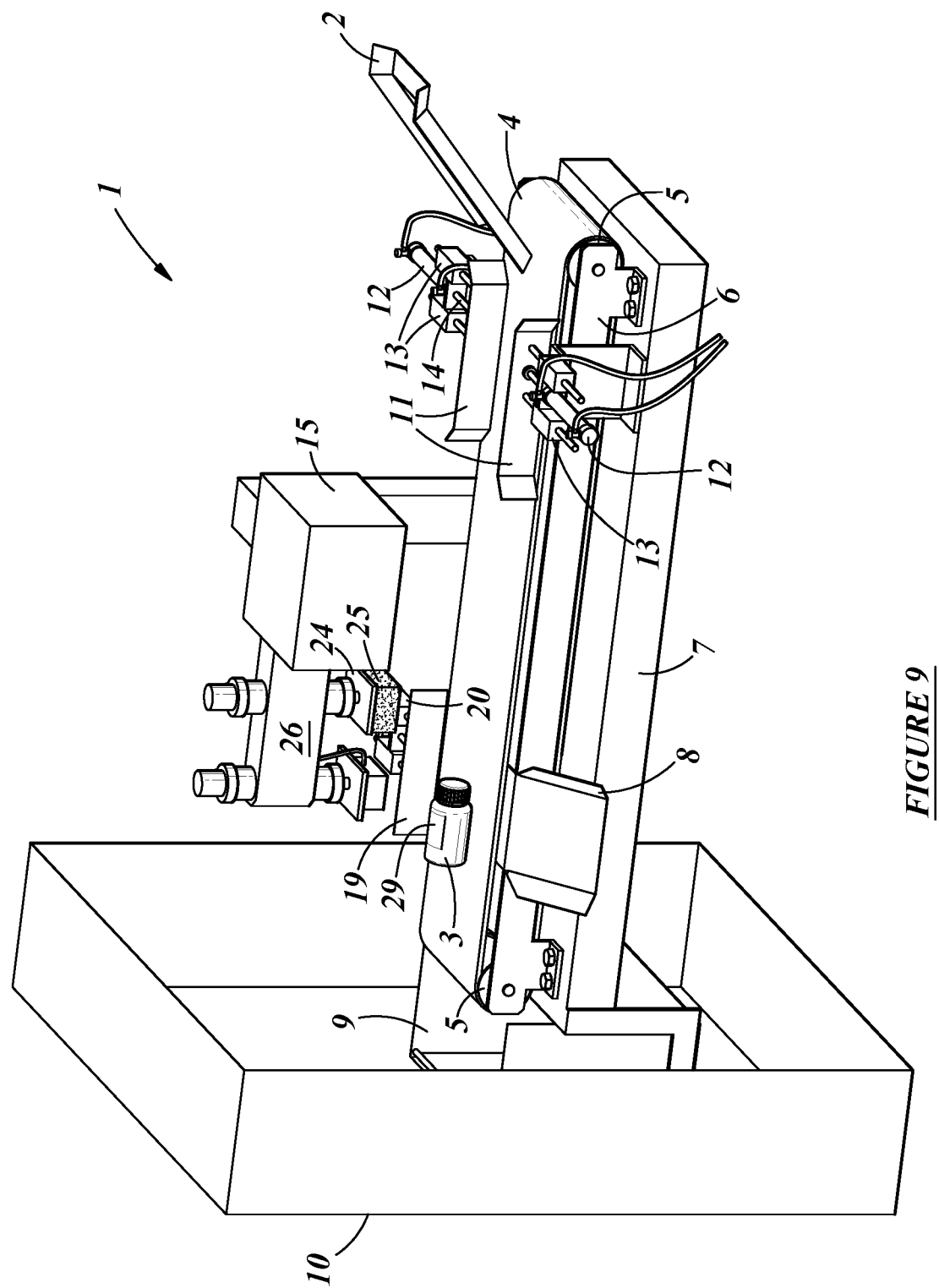
FIG. 9 shows the same view of the apparatus of FIGS. 1 to 8 with the label attached to the curvature of the medicine bottle.
Figure 10:
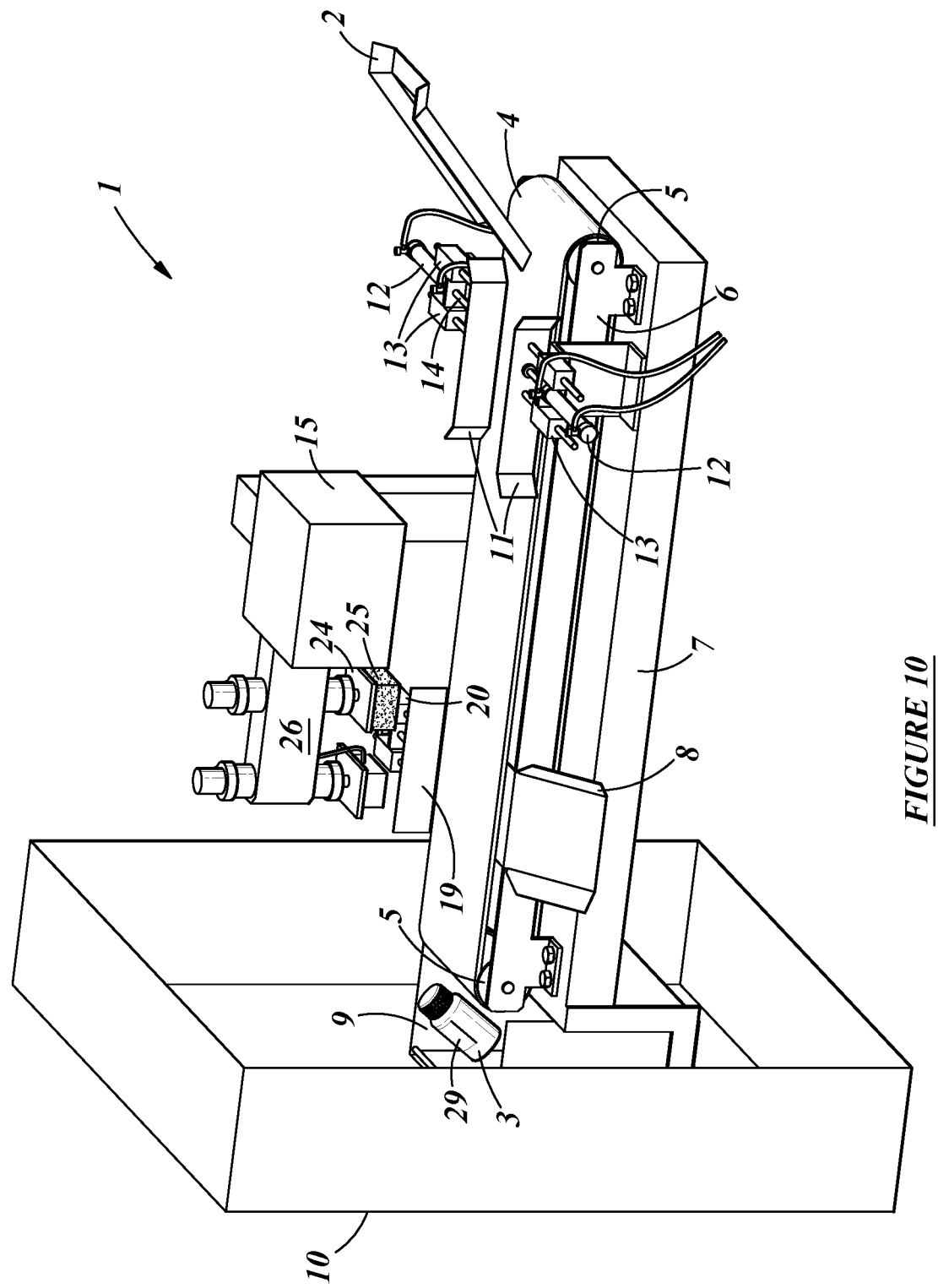
FIG. 10 shows the same view of the dispensing apparatus of FIGS. 1 to 9 with the medicine bottle falling into a dispensing container.
Figure 11:
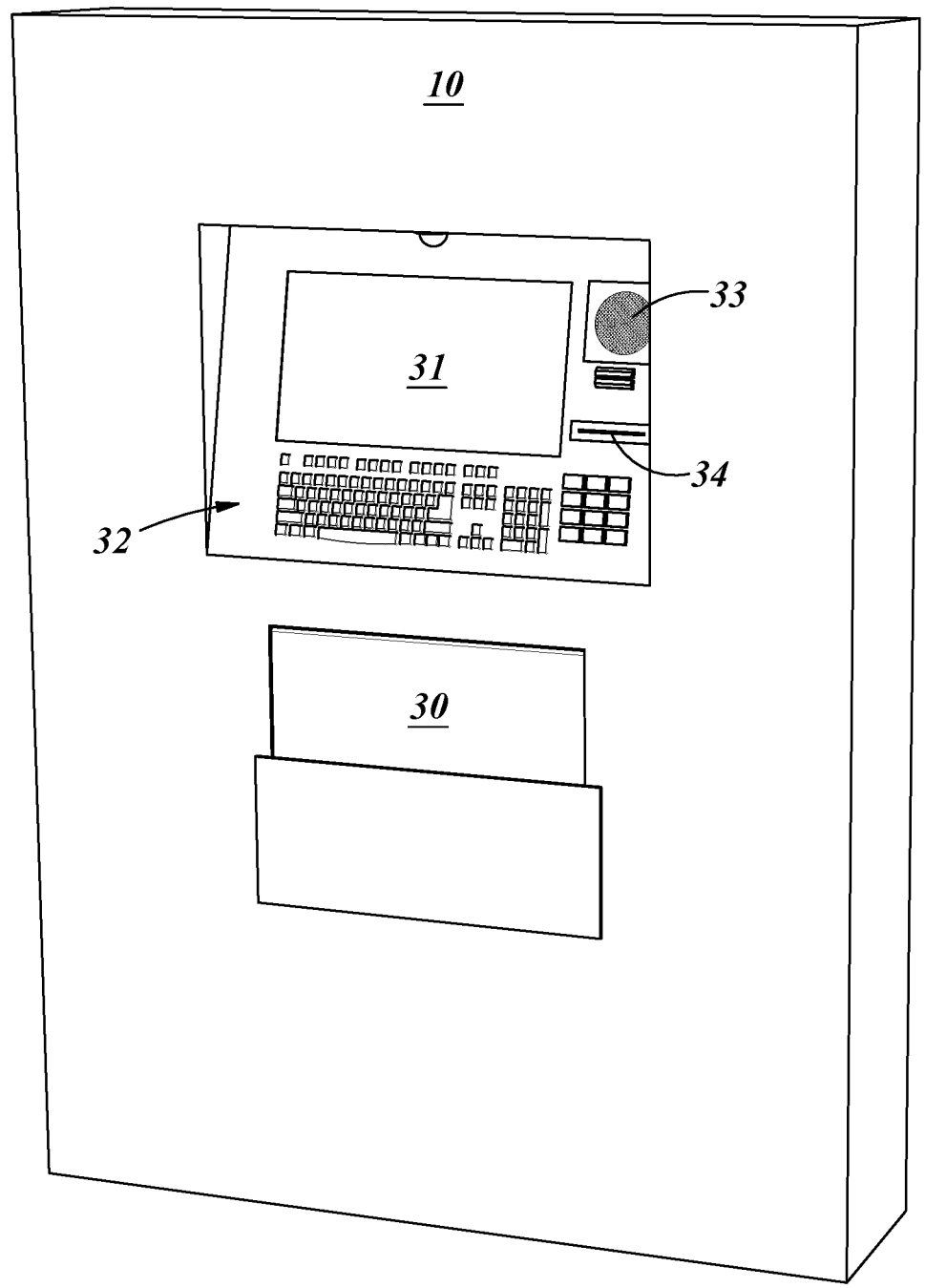
FIG. 11 shows a perspective view of a pharmaceutical dispensing unit (PDU)

In in use, and with reference first to FIG. 1, a bottle 3 is deposited from the chute onto the receiving end of the conveyor belt. The bottle 3 will not necessarily align lengthwise on the conveyor belt 4 or transverse to the conveyor belt 4. To ensure proper alignment of the bottle 3 the alignment plates 11 move closer together and force the bottle alignment as is shown in FIG. 2. The conveyor belt 4 may include a centrally extending recess (not shown) to support the bottle and to prevent it from rolling to the size of the conveyor belt 4. As shown in FIG. 3, the bottle is now moved to underneath the label applicator and a label 29 having an adhesive operatively underside is pushed onto the bottle 3 as is shown in FIG. 4. In FIG. 5, the label applicator has moved to its retracted position and the label is attached to the bottle albeit only at the central portion of the label 29 opposite ends of the label have not been pushed down onto the curvature of the bottle. As is shown in FIG. 6, the bottle 3 now moves to a position underneath the sponge 25 and the device that operates the sponge pushes the sponge 25 downwards as is shown in FIG. 7 and onto, as is shown in FIG. 8, the bottle 3. This movement forces the sponge 25, which is of course resiliently deformable to deform according to the shape of the curvature of the bottle 3 and it causes the label to be forced properly onto the curvature of the bottle 3.

At this point, if a barcode or other reader such as a camera having character recognition facilities, the discard plate 19 may be actuated to discard the bottle down the discard shoot 8 if it is determined that the incorrect medicine or dosage is about to be dispensed. If however it is confirmed that the correct medicine is about to be dispensed the bottle now moves further along the conveyor belt 4 from where it falls from the discharge end of the conveyor belt 4 into the dispensing container 9 where it is ready for collection by a patient once the patient has performed the necessary actions at the front end of the PDU. This process of dispensing the medicine is known and the medicine will only be dispensed once the patient has been positively identified and other requirements such as payment for the medicine is confirmed. In the dispensing process, access to a pharmacist may also be established through use of the communication means of the PDU which may even include a video link.

As shown in FIG. 12, a sachet 36 made of plastics material and including medicament is dispensed inside a sachet dispensing container or box 35, down the chute 2, onto the receiving end of the conveyor belt 4. The dispensing box 35 may or may not be orientated on the conveyor belt 4 using the alignment plates 11. The alignment otherwise of the box will depend on the size of the label to be adhered to the sachet 36. Once the label 29 is attached with the label attachment means and once the sponge 25 has been activated to ensure proper adherents of the label to the uneven surface (due to the medicament inside of the sachet) of the sachet 36 by pushing down on the sachet 36 and label and deforming to conform with the uneven surface of the sachet, the suction cup 37 is moved onto the sachet 36 from where vacuum apparatus 38, suction cup 37 and suction arm 39 ensure that the sachet remains attached to the suction cup 37 as the suction cup 37 is moved upwards away from the dispensing box 35. Once the sachets 36 moved out of the box, the discard plate 19 is moved forward across the conveyor belt 4 to push the dispensing box 35 to the side and onto the discard chute 8. The box then travels down the inclined discard chute 8 into a collection receptacle from where it may be reused.

Sensors in the form of barcode readers and all cameras having character recognition software may be used at various intervals along the path of travel of the article to be labelled to ensure that the correct medicament is dispensed, that the and the like. If the incorrect medicament is about to be dispensed or if the incorrect information is displayed on the label, the discard plate 19 will be activated to move any such article off the conveyor belt 4 and down the discard chute 8.

It is envisaged that the invention described herein will be convenient to use in that sachets may be dispensed using open topped rectangular boxes, suction or vacuum means and a discard means for discarding the boxes from the conveyor belt. Once the box has been moved off the conveyor belt, the vacuum force is released so that the sachet drops back onto the conveyor belt from where it moves to the discharge end of the conveyor belt and falls into the dispensing container.

Labels are also securely attached to articles such as boxes, sachets having uneven surfaces and bottles having curved surfaces through use of the resiliently deformable sponge that, once a label is partially attached to an article, pushes the label further onto the article and such articles uneven or curved or angled surface. In the case of a box having a flat surface, the sponge is also useful to apply additional pressure which may not have been sufficiently applied by the label applicator.

It will be appreciated by those skilled in the art that the invention is not limited to the precise details as described herein. For example, labels may be attached to other types of packaging instead of bottles and sachets as described herein. For example, labels may also be attached to cardboard and other material boxes and the like.

The invention claimed is:

1. A pharmaceutical dispenser comprising:
   a conveyor belt comprising:
      a receiving end for receiving an article to be labelled;
      a discharge end for discharging the article after the article has been labelled;
      a label applicator for attaching a label to the article;
      a resiliently deformable object for securely forcing the label onto the article, wherein the discharge end terminates at a dispensing container for discharging the article into the dispensing container after the article has been labelled, wherein the dispensing container is accessible from a front of the pharmaceutical dispenser and separable from the article; and
   an inclined surface adjacent to the conveyor belt, disposed to a side of the conveyor belt at an oblique angle with respect to the conveyor belt and extending a portion of a length between the receiving end and the discharge end;

a discharge device disposed at an opposite side of the conveyor belt and extending the portion of the length, wherein the discharge device is extended onto the conveyor belt by an actuating rod to push the article onto the inclined surface.

2. The pharmaceutical dispenser of claim 1, wherein the article has a curved, uneven, angled or flat surface.

3. The pharmaceutical dispenser of claim 1, wherein the article is a bottle, box or sachet.

4. The pharmaceutical dispenser of claim 1, wherein the conveyor belt is a continuous conveyor belt extending around rollers at opposite ends of the conveyor belt.

5. The pharmaceutical dispenser of claim 1, wherein the label applicator includes an applicator arm movable between a retracted position in which it receives the label at a free end of the arm and an extended position in which an adhesive side of the label is pushed onto the article.

6. The pharmaceutical dispenser of claim 1, wherein the resiliently deformable object is movable between a position removed from the article to a position in which it is forced onto the label and the article so that it deforms to take the shape of an exposed side of the article to force the label to securely attach to the article.

7. The pharmaceutical dispenser of claim 6, wherein the object is made from foam rubber or is a sponge.

8. The pharmaceutical dispenser of claim 1, further comprising a suction cup movable between an engagement position in which it engages a sachet in a box and a retracted position in which the sachet is attached to the suction cup and moved out of the box.

9. The pharmaceutical dispenser of claim 8, wherein the discharge device pushes the box off the conveyor when the suction cup is in its retracted position.

10. The pharmaceutical dispenser of claim 8, wherein the suction cup releases the sachet when the suction cup is in its retracted position and when the box is removed from the conveyor so that the sachet falls onto the conveyor.

11. The pharmaceutical dispenser of claim 1, wherein the conveyor belt receives the article at the receiving end, the receiving end terminating underneath a discharge end of a delivery chute.

12. The pharmaceutical dispenser of claim 1, wherein the dispensing container comprises a trapdoor.

13. The pharmaceutical dispenser of claim 12, wherein the pharmaceutical dispenser includes a patient interface in a front cover thereof.

14. The pharmaceutical dispenser of claim 1, wherein the conveyor belt moves the article along underneath the label applicator for attaching the label and then to underneath the resiliently deformable object for securely forcing the label onto the article.

15. The pharmaceutical dispenser of claim 1, wherein one or more alignment plates, an alignment actuator rod, an alignment actuator housing, and one or more alignment movement support blocks align the article to be labelled on the conveyor belt before the label is applied to the article.

16. The pharmaceutical dispenser of claim 1, wherein a suction device is located above the conveyor belt and the suction device includes a suction cup movable onto the article to attach to the article through negative vacuum pressure and to lift the article away from the conveyor belt by moving the suction cup away from the conveyor belt.

17. A labelling apparatus comprising a conveyor, the labelling apparatus comprising:

a receiving end for receiving an open top dispensing box with an article to be labelled therein;

a discharge end for discharging the article;

a label applicator for attaching a label to the article;

a resiliently deformable object movable to securely force a portion of the label onto the article;

a suction cup movable between an engagement position in which the suction cup engages the article in the dispensing box and a retracted position in which the article is attached to the suction cup and moved out of the dispensing box; and a discard apparatus that pushes the dispensing box off the conveyor after which the suction cup releases the article so that the article falls back onto the conveyor.

18. The apparatus of claim 17, wherein the article comprises a curved, uneven, angled or flat surface.

19. The apparatus of claim 17, wherein the article is a bottle, box or sachet.

20. The apparatus of claim 17, wherein the article is a dispensing box that contains a medicament.

21. The apparatus of claim 17, wherein the conveyor is a continuous conveyor extending around rollers at opposite ends of the conveyor.

22. The apparatus of claim 17, wherein the label applicator comprises an applicator arm movable between a retracted position in which it receives the label at a free end of the arm and an extended position in which an adhesive side of the label is pushed onto the article.

23. The apparatus of claim 17, wherein the resiliently deformable object is movable between a position removed from the article to a position in which it is forced onto the label and the article so that it deforms to take the shape of an exposed side of the article to force the label to securely attach to the article.

24. The apparatus of claim 23, wherein the resiliently deformable object comprises a foam rubber or a sponge.

25. The apparatus of claim 17, wherein the suction cup in the engagement position engages a sachet in a dispensing box.

26. The apparatus of claim 17 wherein the conveyor receives the article at the receiving end, the receiving end terminating underneath the discharge end of a delivery chute.

27. The apparatus of claim 17 wherein the discharge end of the conveyor terminates at a dispensing container for discharging the article, after the article is labelled, into the dispensing container.

28. The apparatus of claim 27, wherein the dispensing container comprises a trapdoor located in a front cover of a pharmaceutical dispenser.

29. The apparatus of claim 28, wherein the pharmaceutical dispenser comprises a patient interface in the front cover thereof.

30. The apparatus of claim 29, wherein the patient interface comprises a screen, a microphone, a speaker, a keypad and a card reader.

31. The apparatus of claim 17, wherein the conveyor moves the article along underneath the label applicator for attaching the label and then underneath the resiliently deformable object for securely forcing the label onto the article.

32. The apparatus of claim 17, wherein one or more alignment plates, an alignment actuator rod, an alignment actuator housing, and one or more alignment movement support blocks align the article to be labelled on the conveyor before the label is applied to the article.

33. The apparatus of claim 17, wherein a suction device is located above the conveyor belt and the suction device comprises the suction cup that is movable onto the article to attach to the article through negative vacuum pressure and to lift the article away from the conveyor belt by moving the suction cup away from the conveyor belt.

34. A labelling method comprising the steps of:
moving an open top dispensing box with an article to be labelled therein on a conveyor, to pass by a label applicator;
attaching a label, with the label applicator, at least partially, to the article;
forcing, with a resiliently deformable object, a portion of the label onto the article;
moving a suction cup between an engagement position in which the suction cup engages the article in the dispensing box to a retracted position in which the article is attached to the suction cup and moved out of the dispensing box; and
moving a discard apparatus to push the dispensing box off the conveyor after which the suction cup releases the article so that the article falls back onto the conveyor.

35. The method of claim 34, wherein the article is a carton box.

36. The method of claim 34 wherein the article is a plastics material container.

37. The method of claim 34, wherein the article is a resiliently deformable bag.

38. The method of claim 34, wherein the article is a sachet.

* * * * *